United States Patent [19]
Coleman

[11] 3,925,636
[45] Dec. 9, 1975

[54] METHOD AND MACHINE FOR AXIALLY ALIGNING AND WELDING CONTINUOUS RAIL
[75] Inventor: William R. Coleman, Earlham, Iowa
[73] Assignee: Darrell L. Dehm, Eldon, Iowa; a part interest
[22] Filed: Aug. 15, 1974
[21] Appl. No.: 497,520

[52] U.S. Cl............. 219/104; 33/174 L; 33/174 R; 33/180 R; 219/101
[51] Int. Cl.² ....................................... B23K 11/02
[58] Field of Search .......... 33/174 L, 174 R, 180 R; 219/100, 101, 104

[56] References Cited
UNITED STATES PATENTS

| | | | |
|---|---|---|---|
| 3,012,330 | 12/1961 | Mendham | 33/174 L |
| 3,036,204 | 5/1962 | Stieglitz et al. | 219/101 |
| 3,488,467 | 1/1970 | Ansel et al. | 219/101 |
| 3,724,084 | 4/1973 | McNeece | 33/174 L X |
| 3,816,695 | 6/1974 | Deffenbaugh | 219/100 |
| 3,840,994 | 10/1974 | Izumi et al. | 33/174 L X |

Primary Examiner—C. L. Albritton
Assistant Examiner—N. D. Herkamp
Attorney, Agent, or Firm—Rudolph L. Lowell

[57] ABSTRACT

The present invention provides an electrical sensing apparatus supported on a welding machine for movement toward and away from a working position adjacent to and opposite the end sections of the rails that are to be butt welded together. Movably supported on the apparatus for movement transversely of the rail end sections, when the frame is in a working position, are sensor assemblies that includes for each rail end section a pair of web contact switches and a crown contact switch, each of which switches is actuated when contacted by a corresponding rail end section. The web contact switches are initially set in a reference position or plane corresponding to a laterally aligned position of the rail end section wherein all the web contact switches are in engagement with a side surface of the rail web sections. In the alignment of the rails to be welded each sensor assembly is automatically controlled for successive movements of the web contact switches into and out of contact engagement with a corresponding web side surface of the rail end sections until all of the web contact switches are in simultaneous engagement and located within the reference position or plane to define the laterally aligned positions of the rail end sections. Thus, each time a web contact switch is actuated, the rail end section corresponding thereto is transversely adjusted toward a laterally aligned position. This cycle of operation is automatically repeated until the rail end sections are in lateral alignment. The rail end sections are then vertically adjusted into engagement with corresponding crown switches into axially aligned positions. The rail end sections are then locked against relative movement and butt welded together.

4 Claims, 15 Drawing Figures

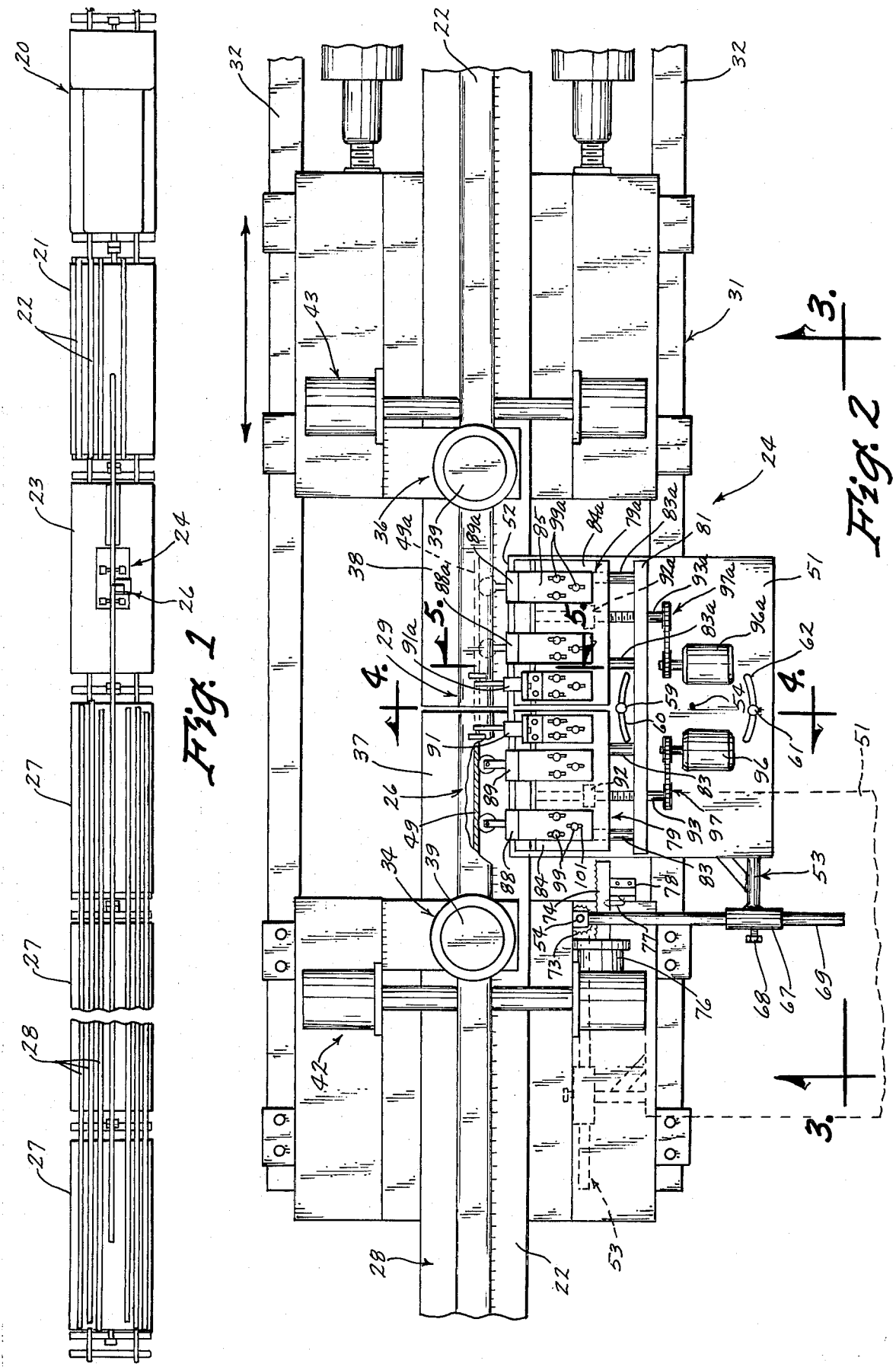

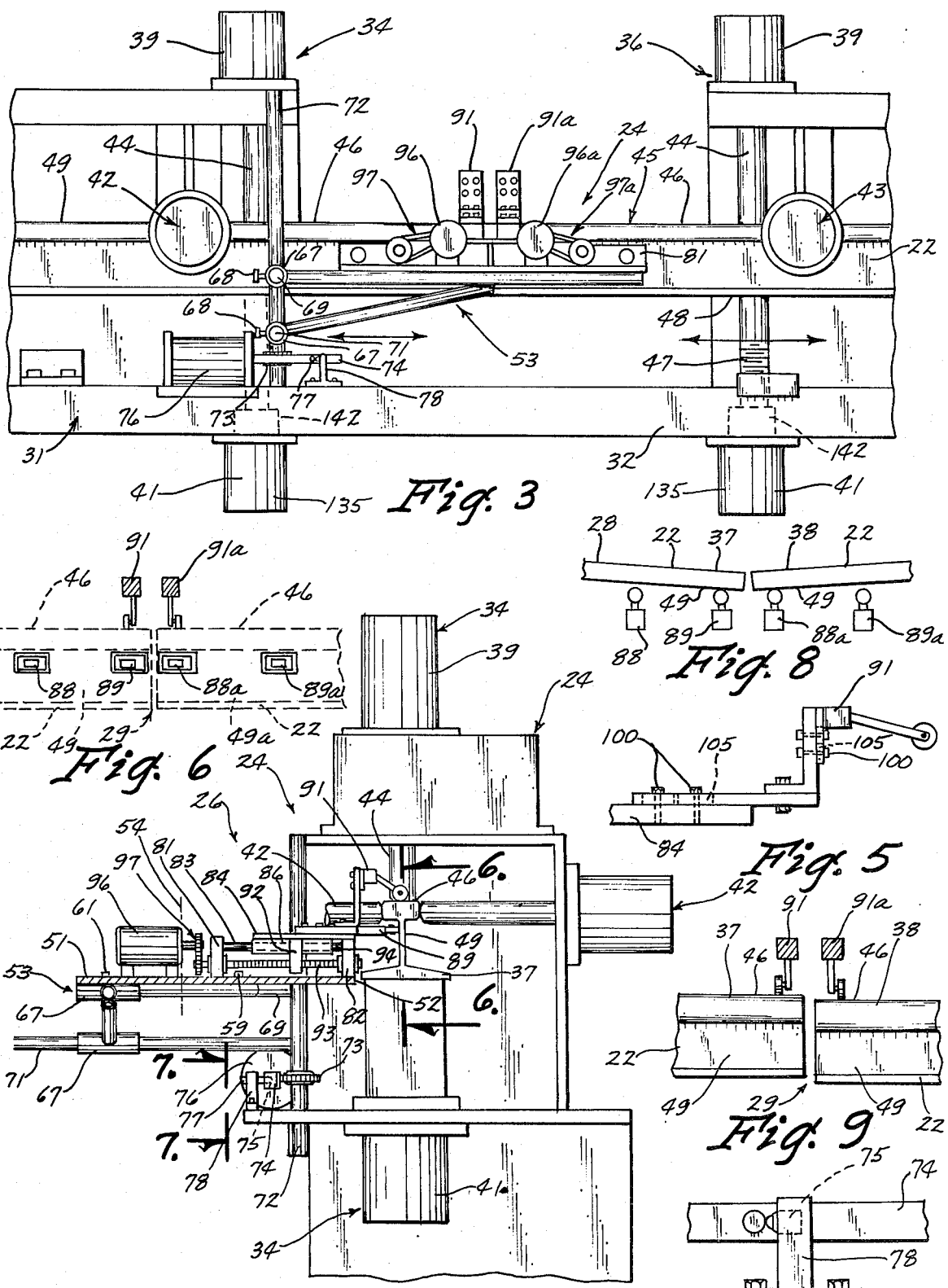

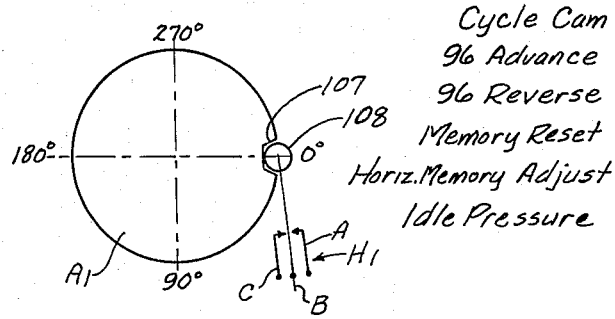
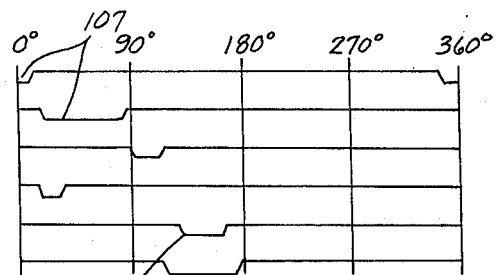
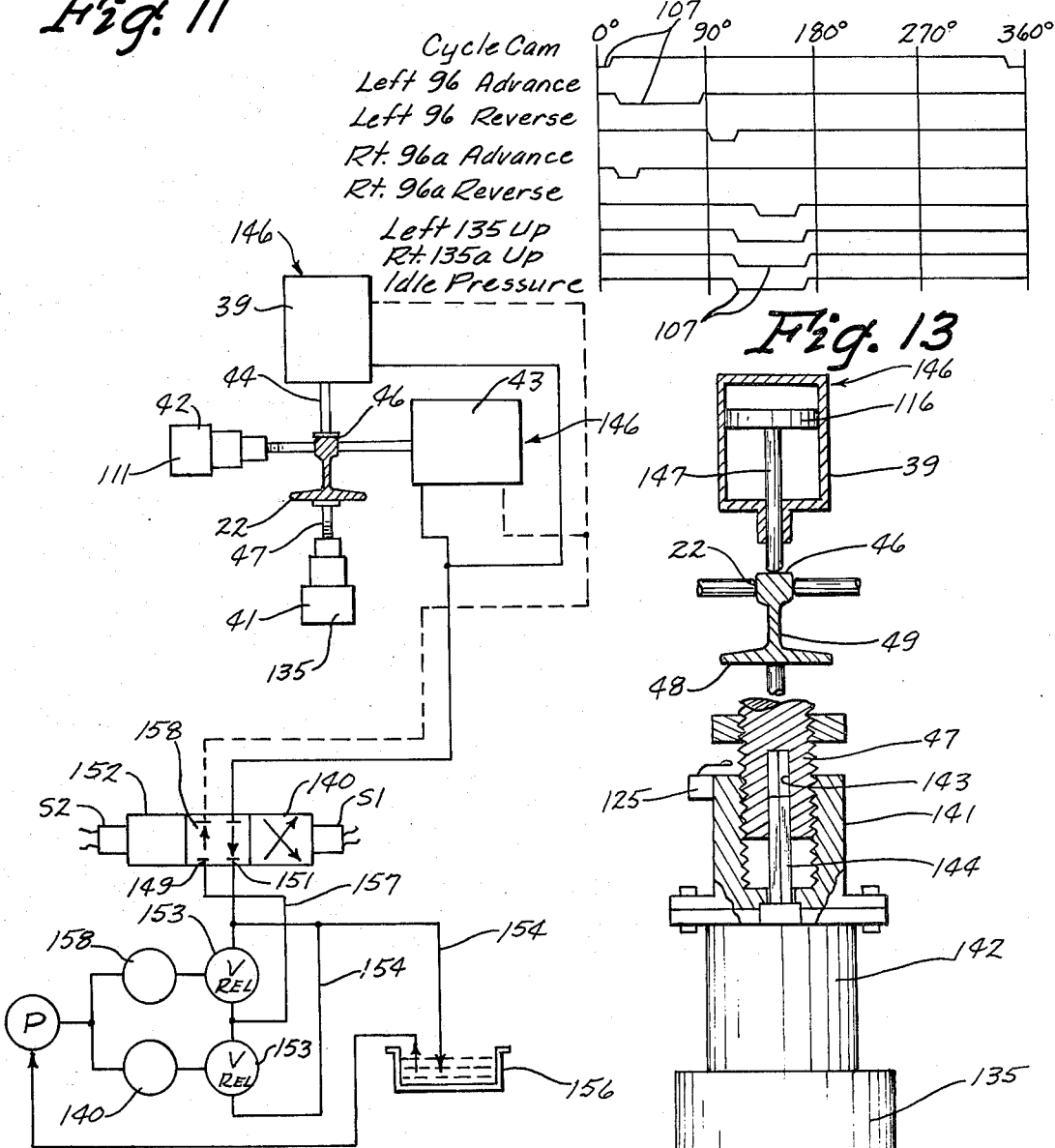
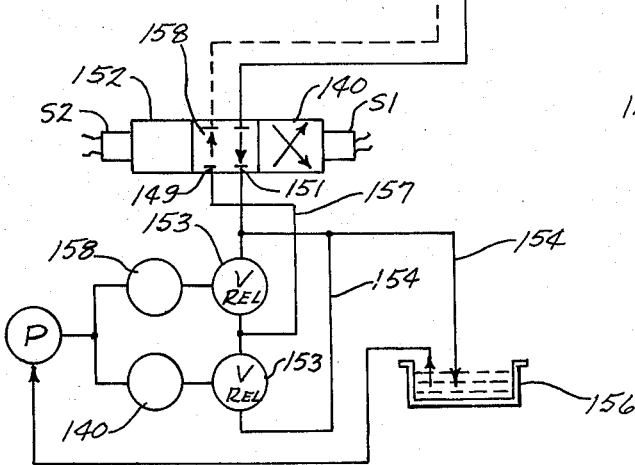
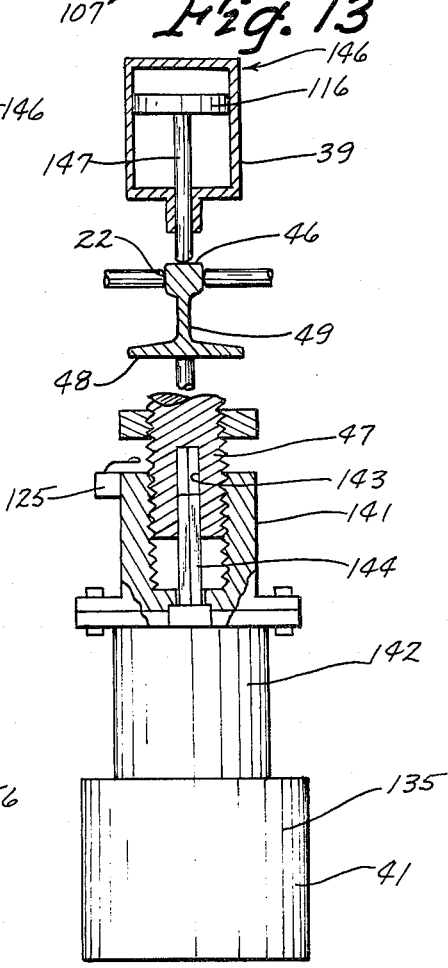

METHOD AND MACHINE FOR AXIALLY ALIGNING AND WELDING CONTINUOUS RAIL

BACKGROUND OF THE INVENTION

The butt welding of rails to form a continuous rail having a length of about a quarter of a mile or more has been known for many years. However, the axial alignment of the rails to be welded, so far as is known, is still manually performed. In this respect, the adjacent ends of the rails to be welded are gripped between corresponding relatively adjustable laterally and vertically movable hydraulically actuated jacks or clamps. These jacks are manually controlled to move the rails to axially aligned positions determined by visually sighting the rail surfaces with a straight edge. Thus, frequent adjustments of the rails are required followed by a straight edge visual sighting until rail ends to be welded together are in axial alignment. It is apparent that this rail aligning procedure is not only time consuming but fails to assure a uniform or constant standard of rail alignment due to the human factor involved. This often results in the obtaining of a defective weld of reduced strength since the strength of the connected rails is determined by the area of the welded surfaces at the adjoining web sections of the rails.

SUMMARY OF THE INVENTION

The invention provides a method and electrical sensing apparatus for efficiently and quickly axially aligning adjacent rails, in a continuous rail forming operation, to provide uniform connecting welds of maximum strength. When a rail to be welded has a web of reduced thickness the method provides for such rail being located entirely within the lateral confines of the web of greater thickness. This relation is assured by having one corresponding side surface of the rail web sections laterally aligned so that surfaces lie in a previously established reference plane. After the web sections are laterally aligned, the rail end sections are automatically vertically adjusted to position the top surfaces of the crown sections thereof in a common plane to thereby axially align the rail end sections. The rail of reduced dimensions thus has the cross sectional area thereof located entirely within the cross sectional area of the rail of greater dimensions so that the butt weld is made over the full height and thickness of the web section having the smaller dimensions. The rail end sections are thus automatically axially aligned to provide for the forming of a butt weld of maximum strength.

BRIEF DESCRIPTION OF THE DRAWINGS

FIG. 1 is a plan view of a welding train showing generally a welding machine equipped with the automatic rail aligning apparatus of this invention;

FIG. 2 is an enlarged plan view of the welding machine and the rail aligning apparatus of this invention with the electrical sensing assemblies of the apparatus shown in positions providing for lateral rail alignment;

FIG. 3 is a front elevational view of the aligning apparatus as seen on line 3—3 in FIG. 2;

FIGS. 4 and 5 are sectional views on lines 4—4 and 5—5, respectively, in FIG. 2;

FIG. 6 is a detailed sectional view on lines 6—6 in FIG. 4;

FIG. 7 is a detail elevational view as seen along line 7—7 in FIG. 4, of a combination stop and holding switch for a pneumatic air cylinder that forms part of the rail aligning apparatus;

FIG. 8 is a diagrammatic illustration showing sensor or feeler switches of the electrical sensing assemblies in engagement with rails illustrated in a laterally misaligned relation;

FIG. 9 shows vertically misaligned rails and the crown aligning feeler switches therefor;

FIG. 11 is a diagrammatic illustration of a switch actuating cam that forms part of a sequence motor assembly utilized in the electrical circuit of the sensing apparatus;

FIGS. 12 and 13 diagrammatically illustrate developed views of the switch actuating cams in a sequence motor assembly;

FIG. 14 is a diagrammatical showing of the hydraulic control system for hydraulic pressure applying mechanisms for releasably holding the rails in the welding machine; and FIG. 15 diagrammatically illustrates an adjustable hydraulic cylinder assembly that forms part of the hydraulic control system.

DETAILED DESCRIPTION OF THE INVENTION

Figure 10:
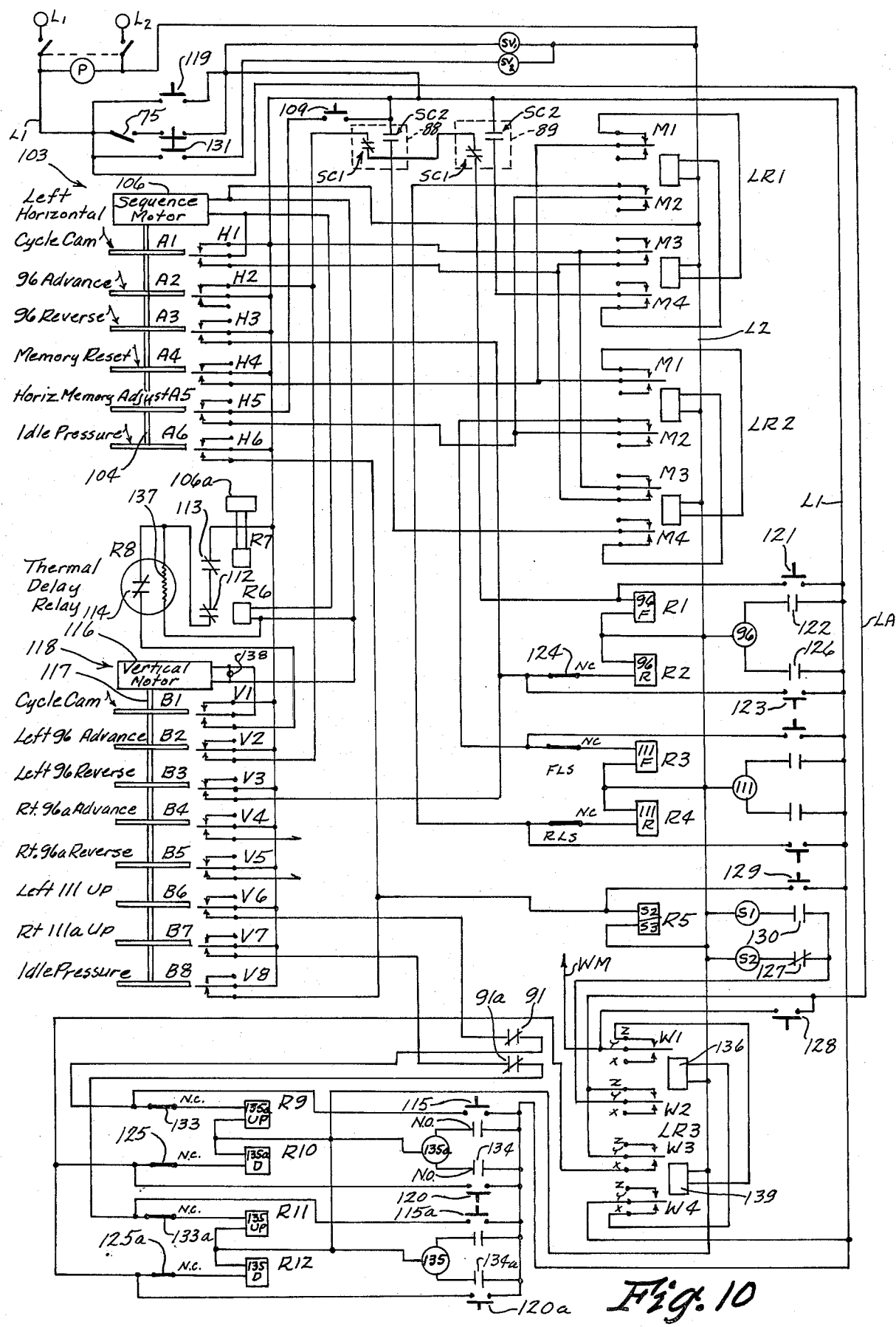
FIG. 10 is a diagrammatic illustration of an electrical circuit for the sensing assembly corresponding to only one of the rail end sections to be axially aligned.

With reference to FIG. 1 of the drawings, there is illustrated what might be termed a "welding train" which consists of a power generating unit 20, such as a deisel engine, a supply car 21 for standard length rails 22, a welding car 23 that carries a welding machine 24, equipped with the electrical rail aligning apparatus 26 of this invention, and finally cars 27 for storing or transporting continuous welded rails 28. As is well-known, a continuous rail is comprised of two or more of the standard rails 22 butt welded together in an end to end relation. The power unit 20 acts as a source of electrical energy for the welding machine 24 and rail aligning apparatus 26 and is a source of power for the various mechanisms required to handle the standard rails 22 from a position on the supply car 21 and through the welding machine 24 to a storage position on the car 27.

In a welding operation, a standard rail 22 is initially moved from the car 21 into the welding machine 24 with its trailing end located in the machine welding zone, indicated at 29 (FIG. 2). A second standard rail 22 from the car 21 is then moved into the welding machine 24 with its leading end positioned against the trailing end of the first standard rail 22. These two rails, after being axially aligned, are butt welded together and moved as a continuous rail section or assembly 28 from the welding machine on to the car 27 to provide for the welding thereto of a third standard rail 22. The butt welding operations are repeated until a continuous welded rail 28 of a desired length is obtained. These rails 28 may then be used in place or stored on the cars 27 for transport to a rail laying job. Especially, where the continuous rails 28 may be up to one-half mile in length, the welding train is taken directly to the situs of the rail laying operation so as to eliminate the inconvenience and the additional cost that would be involved in the transportation of continuous welded rails of such length.

The welding machine 24 (FIGS. 1 and 2) may be of a usual commercially available type such as a butt rail welding machine manufactured by National Cylinder Gas, Division of Chemetron Corporation of 840 North Michigan Avenue, Chicago, Ill. This type machine generally includes a supporting frame, indicated generally as 31, that has a pair of side members 32. Extended between and supported on the side members 32 are a pair of clamp or jack structures 34 and 36 which are spaced longitudinally of the frame 31 so as to define therebetween the rail welding zone 29. The clamp structures 34 and 36, which will hereinafter be referred to as "left hand" and "right hand" structure, respectively, are similar in construction and operation and correspond to the trailing and leading end sections 37 and 38, also respectively, of the standard rails 22 that are to be welded together.

Each clamp structure 34 and 36 includes a pair of opposed vertically spaced upper and lower jack units 39 and 41, respectively, (FIGS. 3 and 4) and a pair of front and rear opposed horizontally spaced jack units 42 and 43, also respectively, between which the rails 22 are movable longitudinally of the welding machine 24. The upper jack units 39 have piston rods 44 engageable with the crown 46 of a rail ball section 45 of an associated rail 22. In turn, the lower jack units 41 have screws 47 that are engageable with the rail base section 48. The front and rear horizontal jack units 42 and 43, respectively, (FIG. 4), are engageable with the opposite side surfaces of a rail web section 49. As will be later described in detail, the rail jack units are relatively controlled by the electrical sensing apparatus 26 of this invention to provide for the automatic and progressive movement into axial alignment of the rails to be welded together. When the rails are axially aligned, the sensing apparatus 26 is automatically rendered inoperative and then moved away from the welding zone 29 after which the axially aligned rails are welded together.

On completion of a welding operation, the welded rail assembly 28 is moved from the machine until its trailing end 37 is located between the jack units 39, 41 and 42, 43 of the left hand clamp structure 34. A standard rail 22 to be welded to the rail assembly 28 is then taken from the supply car 21 and moved in a usual manner into the welding machine 24 until its leading end section 38 is positioned within the welding zone 29 in abutting engagement with the end section 37 of the rail assembly 28 and between the jack units of the right hand clamp structure 36. The sensing apparatus 26 is then returned to its operating position to again provide for the automatic actuation of the rail jack units 39, 41 and 42 and 43 to progressively adjusted positions until the rail assembly 28 and the standard rail 22, to be welded thereto, are in axial alignment.

The rail sensing apparatus 26 (FIGS. 2 and 4) includes a horizontal plate member 51 of a generally rectangular shape which, when the apparatus 26 is in an operating position, projects laterally outwardly from the welding machine at the welding zone 29 with what will be termed its working or inner end 52 in a position adjacent to and opposite the rail end sections 37 and 38. The platform or plate member 51 is adjustably mounted on a supporting frame 53 for a limited rotational movement about a vertical axis, indicated at 54. An upright locking pin 59 on the supporting frame 53 is projected upwardly through an arcuate slot 60 formed in the plate member 51. An upright locking pin 61 on the frame support 53 projects upwardly through an arcuate slot 62 that is also formed in the plate member 51. The slots 60 and 62 are generated about a radius that has its center at the vertical axis 54 so that the plate member 51 is rotatably adjustable about such axis through a limited angular distance defined by the length of the slots 60 and 62.

The supporting frame 53 has a pair of vertically spaced tubular slide bearings 67 that are adjustably mounted on parallel guide tubes 69 and 71. The bearings 67 are held in adjusted positions by locking screws 68. The guide tubes extend horizontally from a vertical post or shaft 72 which is rotatably carried on the welding machine 24 to one side of the welding zone 29 and adjacent the left hand clamping structure 34.

It is seen, therefore, that when the guide tubes 69 and 71 are projected laterally from the front of the welding machine 24, the platform 51 of the rail sensing apparatus 26 is adjustably movable on the guide tubes 69 and 71 transversely of the rails 22 and is rotatable about the vertical axis 54 to provide for the adjustment of its working or inner end 52 relative to the longitudinal axes of the rails to be welded.

The carrying post 72 for the supporting structure 53 (FIGS. 2 and 4) has a gear 73 operatively associated with a rack 74 that is formed as part of a piston rod for a double acting pneumatic cylinder 76 extended longitudinally of and mounted on the machine frame 31. On extension of the rack 74, and resultant rotation of the carrying post 72, the rail aligning apparatus 26 is moved to its working or operating position wherein the working end 52 of the platform 51 faces the end sections 37 and 38 of the rails to be welded. This operating position of the platform 51 is defined by the engagement of a laterally extended pin or abutment member 77 (FIG. 4) on the rack 74 with an adjustable stop member 78 mounted on the machine frame 31. A holding switch 75 (FIGS. 4 and 7) in the electrical control circuit (to be later described) for the pneumatic cylinder 76 is carried in the stop member 78 and, when closed by the lateral pin 77, functions to provide a holding air pressure in the cylinder 76 whereby the platform 51 is positively maintained in the operating position thereof during the rail aligning operation. On the retraction of the rack 74 the platform 51 is moved to a position along one side of the machine frame 31, as shown in dotted lines in FIG. 2, out of the welding zone 29.

Mounted on the platform 51 for independent adjustable movement longitudinally thereof are a pair of carriage assemblies 79 and 79a hereinafter referred to as left and right hand carriage assemblies, respectively, and corresponding to the rail end sections 37 and 38, also respectively. Since each carriage assembly 79 and 79a is similar in construction and operation, only the left hand carriage assembly 79 will be described in detail, with corresponding parts being indicated by like numbers with a suffix letter *a*.

The left hand carriage assembly 79 includes a pair of upright mounting members 81 and 82 (FIGS. 2 and 4) extended transversely of and secured to the top side of the platform 51 and hereinafter to be referred to as front and rear bearing support bars, respectively. A pair of parallel guide rods 83 spaced transversely of the platform 51 have opposite end sections thereof carried in the supporting bars 81 and 82. The rods 83 are positioned in a common horizontal plane that is vertically spaced above the horizontal platform 51. A switch mounting panel 84, that carries a pair of web contact switches 88 and 89 and a crown contact switch 91 has a pair of transversely opposed pairs of tubular bearings 86 slidably mounted on the rods 83.

Depending from the mounting panel 84 at a position intermediate the guide rods 83 is a nut member 92 operatively associated with a screw shaft 93 that has one end rotatably mounted in the front supporting bar 81 and an opposite end 94 rotatably extended through and projected rearwardly from the rear supporting bar 82. A reversible electric motor 96, secured to the top surface of the platform 51, is connected in a driving relation with the screw shaft 93 by a chain and gear assembly 97. Thus, in response to the operation of the motor 96, the panel 84 is reciprocally moved in a horizontal plane longitudinally of the platform 51.

The web contact switches 88 and 89, hereinafter to be referred to as the left hand web switches, are engageable with longitudinally spaced portions of the web section 49 of the left hand rail end section 37 (FIG. 2). These contact switches are carried at the front end of the panel member 84 and project forwardly therefrom for rail engagement. The web contact switches 88 and 89 are adjustable forwardly and rearwardly of the panel member 84 by the extension of switch holding screws 99 (FIGS. 2 and 5) through elongated openings 101 formed in a switch plate 85. The crown contact switch 91, to be referred to as the left hand crown switch hereinafter, is supported for horizontal and vertical adjustment on the panel member 84 by holding screws 100 and associated elongated slots 105, and is adapted for contact engagement with the top surface of the crown section 46 (FIG. 4) of the left hand rail end section 37.

To commence welding operations upon a batch of rails 22 to form a continuous welded rail 28, the web switches 88, 89, 88a and 89a of the aligning apparatus 26 are initially adjusted relative to a reference or vertical plane which defines a laterally aligned relation of the rail end sections 37 and 38 to be welded wherein the sides of the web sections to be sensed lie in the reference plane. This reference plane may be determined by any suitable method. Thus, a rail 22 may be initially extended across the welding zone 29 longitudinally of the machine frame 31 and horizontally levelled by manual adjustment of the clamp structures 34 and 36 at a predetermined low position for the lower jacks 39. The rail aligning apparatus 26 is then swung into its sensing or operating position by actuation of the air cylinder 76. The web sensing switches 88, 89, 88a and 89a are then relatively adjusted to provide for their contact engagement with corresponding longitudinally spaced web portions of the reference rail 22.

These positions of the web switches are illustrated in FIGS. 2 and 4 and are obtained by separate or relative adjustment of the stop member 78 relative to the pin abutment 77 on the rack 74 to define the operating position of the platform 51; the adjustment of the platform 51 relative to the vertical axis 54 to square the working end 52 of the platform 51 with the reference rail; and the adjustment of the web contact switches laterally of the reference rail 22 into contact with the web section 49. With all of the web switches 88, 89, 88a and 89a in a common horizontal plane and in engagement with the facing web side surface of the reference rail 22, the reference plane is established as a vertical plane common to the feeler surfaces of the web switches and to such web side surface. Since the feeler surfaces are in linear alignment longitudinally of the reference rail 22, their location in the reference plane will define a laterally aligned relation of the rails to be welded when the web contact switches 88, 89, 88a and 89a are in contact engagement with the web section side surfaces of such rails.

After the web contact switches have been adjusted relative to the web section 49 of the reference rail 22, the reference rail 22 is vertically adjusted to a horizontal position intermediate the low and high limits of adjustment of the lower jacks 39. The crown switches are then vertically adjusted into contact engagement with the rail crown surface 46.

With the reference plane for rail lateral alignment established, the reference rail is lowered to the low position therefor, and the rail aligning apparatus 26 is moved to its rest position. The reference rail 22 is then advanced longitudinally of the welding machine 24 until only its trailing end 37 is located within the welding zone 29. The leading end 38 of a second rail 22 is then moved into the welding zone 29 and against the rail end section 37 and the clamping structures 34 and 36 are moved into clamping positions with the rails to lock them against relative movement. The rail aligning apparatus 26 is then moved to its working position, shown in full lines in FIG. 2, it being understood that during this movement the carriage assemblies 79 and 79a are in positions retracted from the platform end 52.

Let it be assumed, and as illustrated in FIG. 8, that on an initial advance operation of the motors 96 and 96a to sense the rail end sections 37 and 38 for lateral alignment that the adjacent web contact switches 89 and 88a initially engage the web sections 49. In this event, by electrical circuitry to be later described, the engagement of the switches 89 and 88a concurrently provides for a backing up or rearward movement of the carriage assemblies 79 and 79a away from the rails for a time interval providing for the release of the rails from the holding pressure of the clamping structures 34 and 36 and a relative actuation of the horizontal jack units 42 and 43 to adjust the rail end sections 37 and 38 toward laterally aligned positions. On termination of this time delay interval, the holding pressure of the clamping structures is reapplied and carriage assemblies 79 and 79a are again advanced for sensing engagement of the web contact switches 89 and 88a with the web sections 49 of the rail end sections 37 and 38, all respectively.

This cycle of operation is automatically repeated to provide successive increment adjustments of the horizontal jack units 42 and 43 until the rail end sections 37 and 38 are laterally aligned as indicated by the simultaneous engagement of all four of the web switches 88, 89, 88a and 89a with corresponding web sections 49 of the rail end sections 37 and 38. When this condition exists, namely, when the four web contact switches are in simultaneous engagement with corresponding web sections of the rail ends 37 and 38, the feeler surfaces thereof are all located in the previously established reference plane defining a laterally aligned relation of the rail ends to be welded together. This simultaneous engagement of all of the web contact switches with the rail end sections 37 and 38 automatically provides for the actuation of the vertical jacks 39 and 41 of the clamp structures 34 and 36 to vertically adjust the rail end sections 37 and 38 into contact engagement with their respective crown switches 91 and 91a whereby to axially align the rail end sections 37 and 38. When all of the sensing switches have thus been moved to their previous manually adjusted reference positions, the rail end sections 37 and 38 are locked by the clamping structures 34 and 36 in axial alignment and the rail aligning apparatus 26 is swung to its rest position. The end sections 37 and 38 are then butt welded together.

The electric circuit providing for the manual adjustment of the sensing switches into a reference plane and the later automatic alignment of the rails relative to the reference plane is shown in FIG. 10. For the purpose of convenience and clarity, the circuit illustrates only those web sensing switches corresponding to the left hand clamping structure 34 and associated left hand rail end section 37. A similar circuit (not shown) for the right hand rail end section 38 is required for the right hand clamping structure 36 and web sensing switches of the right hand carriage assembly 79a. This right hand circuit is interconnected for coaction with the circuit for the left hand circuit, as will be later described, to provide a full control of the rail aligning procedures over both of the left and right hand rail end sections 37 and 38.

In each of the left and right hand circuits, the various functions performed in the rail aligning procedure are governed by sets or groups of cam operated microswitches that have corresponding actuating cams driven by a single sequence motor. The composite left and right hand circuit includes three of these groups of cam operated microswitches, namely, a first group for controlling the horizontal adjustment of the left hand rail; a second group for controlling the horizontal adjustment of the right hand rail; and a third group for vertically adjusting both rails. Since the first and second groups of microswitches have similar aligning functions in the left and right hand circuits, and the third group of microswitches is common to the left and right hand circuits, only the first and third groups of microswitches appear in the circuit of FIG. 10 for the left hand rail section 37.

Referring to FIG. 10, the group of cam actuated microswitches for controlling horizontal adjustment of the left hand rail section 37, designated generally as 103, includes microswitches H1 through H6, inclusive, and corresponding actuating cams A1 through A6, also inclusive. All of the cams are mounted on a common shaft 104 of a sequence motor 106. The cam A1 is a cycle cam that controls the horizontal sequence driving motor 106 for operation through one revolution of the cam shaft 104. Its associated switch H1 is in series with the driving motor 106 and opens the motor circuit to stop the cam shaft 104 at its home position after completion of one revolution. As illustrated in FIG. 11, for switch H1 and associated cam A1, which are exemplary of all of the cam operated microswitches, the cam has a single notch 107. When roller 108 of switch H1 is in the notch, the circuit of motor 106 is open. The switch H1 is a single pole double throw switch so that when the shaft 104 is in the home position, which occurs when the roller 108 is in the notch 107, the contacts A and B are open but the contacts B and C are closed (FIGS. 10 and 11). The cams A1 through A7, inclusive, are schematically illustrated in developed form in FIG. 12 to show the relative timed relation and duration of actuation of the microswitches H1 through H7, inclusive, during a single revolution of the cam shaft 104 by the sequence motor 106.

To start the horizontal sequence motor 106, the lead line L1 is momentarily connected to the contact C of switch H1 until the cam A1 rotates a few degrees after which the contacts C and B take over for the remainder of the cam revolution. The lead line L1 may be connected in two ways to the sequence motor 106 at its home position, namely, by either depressing the start program button switch 109, or by operating the single pole double throw switches M3 of both memory latch up relays LR1 and LR2. The cam A2, to be referred to as an "advanced cam", controls the forward rotation of the horizontal adjustment motor 96 and functions to connect the lead line L1 to the forward advance relay R1 of the motor 96 through normally closed series sensor contacts SC1. The time interval permitted by the cam A2 to control the forward rotation of the motor 96 is sufficient to advance the sensor switches 88 and 89 for engagement with the web section 49 of the left hand rail section 37. Each of the web contact sensors or switches 88 and 89 includes a pair of microswitches SC1 and SC2, with the microswitches SC1 having the normally closed contacts and the microswitches SC2 normally open contacts. The microswitches SC1 function as forward limit switches, the contacts of which are opened, on engagement of the web sensors 88 and 89 by the rail web section, to stop the forward rotation of the motor 96.

The cam A3, to be referred to as a "reverse cam", operates switch H3 to connect lead line L1 to the reverse relay R2 of the motor 96. This reverse rotation of the motor 96 moves the web sensor switches 88 and 89 away from the web section 49 of the rail end section 37 to permit adjustment of the rail end section 37 into a laterally aligned relation with the rail end section 38.

Cam A4 functions as a 'memory reset' and actuates microswitch H4 to connect the lead line L1 to the memory latch up relays LR1 and LR2 for a short pulse to set these relays in their normal operating positions at a time just preceding the contact of the web sensors 88 and 89 with the rail web section 49. In other words, the latch up relays LR1 and LR2 are cocked in their normal operating positions before the sensor switches 88 and 89 make physical contact with the rail web section 49.

The cam A5 is a horizontal memory adjustment cam. The switch H5, corresponding thereto, selectively connects the lead line L1 to one or the other of the relays R3 and R4 for a forward or reverse rotation of the motor 111, which controls the adjustment of the horizontal jack 42 of the left hand clamp structure 34. The circuit for the microswitch H5 includes the contacts M2 of both of the LR1 and LR2 latch up relays. Thus, the operation of either the relay LR1 or the relay LR2 makes the decision as to whether the motor 111 is to be operated in a forward or a reverse direction.

The cam A6 controls the operation of a hydraulic pressure relay R5. When the rail end section 37 is to be horizontally moved by the clamp structure 34 it is necessary that an idle or low pressure be applied on the clamp structure to permit such adjustable movement. After such adjustment the rail end section 37 is rigidly held against movement by the application of a high hydraulic pressure on the clamp structure 34. When an idle or low pressure is required to permit horizontal lateral adjustment the microswitch H6 is actuated by the cam A6 to connect the lead line L1 to the relay R5.

The horizontal sequence motor 106 will make succeeding one revolution operations to provide for successive incremental adjustments of the rail end section 37 toward a laterally aligned relation with the rail end section 38 until both of the sensors 88 and 89 simultaneously contact the rail web section 49. When this simultaneous contact occurs the sequence motor 106 is stopped at its home position as controlled by the cycle cam A1.

As illustrated in FIG. 10, the horizontal sequence motor 106 for the left hand rail section 37 has a relay R6 connected across the terminals thereof. Similarly, the horizontal sequence motor 106a for the right hand rail section 38 has connected thereacross a relay R7. Each of the relays R6 and R7 (FIG. 10) has normally closed contacts 112, and 113, respectively, that are in series connection with normally closed contacts 114 of a thermo delay relay R8 which connects the starting contacts on a microswitch V1 of a vertical sequence cam motor 116 that has a cam shaft 117. The sequence motor 116 and switch V1 form part of a microswitch assembly 118 which controls the vertical adjustment of the rail end sections 37 and 38. The microswitches V1–V8, inclusive, of the assembly 118 have corresponding actuating cams B1–B8, also inclusive.

The cams B1–B8, inclusive, are shown in developed form in FIG. 13 to ilustrate the timed actuation of the microswitches V1–V8, inclusive, during each revolution of the cam shaft 117. So long as the horizontal sequence motor 106 for the left hand rail section 37 is in operating and has voltage applied across it, the relay R6 is also energized so as to hold open its contacts 112. On completion of the horizontal adjustment of the rail end section 37, into a linearly aligned relation within the reference or base plane, the sequence motor 106 operates to its home position and then stops. At such time the relay R6 is also de-energized so as to close its contacts 112 and indicate to the vertical sequence motor 116 that the aligned left hand rail end section 37 is ready to proceed to a vertically aligned position.

In a like manner, when the horizontal sequence motor 106a for the right hand rail end section 38 has similarly been stopped at its home position, indicating adjustment of the right hand rail end section into the reference plane, the relay R7 will de-energize to close the contacts 113 thereof. With the contacts 112 and 113 closed, the lead line L1 is connected to the microswitch V1 through such contacts and the normally closed contacts 114 of the thermo delay relay R8 whereby the vertical sequence motor 116 is started on its revolution of switching functions. After a time delay of several seconds contacts 114 of the thermo delay relay R8 will open to provide for the stopping of the vertical sequence motor 116 at its home position after one revolution thereof. Since the switch V1 is in series connection with the motor 116, the vertical cam B1 functions as a cycle control cam to stop the motor 116 at its home position on completion of one revolution. The function of cam B1 is thus similar to the function of the cam A1 for the horizontal sequence motor.

As previously mentioned, upon horizontal adjustment of the rail end sections 37 and 38, into laterally aligned positions within the established reference or base plane, the horizontal sequence motors 106 and 106a corresponding thereto are stopped at positions providing for the web sensing switches 88, 89, 88a and 89a being out of engagement and away from the rail web sections 49. The cams B2 and B4, therefore, function to rotate the horizontal adjustment motors 96 and 96a for the left and right hand rail end sections 37 and 38, respectively, to provide for the positioning of the crown contact switches 91 and 91a above the crown sections 46 of the rail end sections 37 and 38 (FIG. 4). With the crown contact switches 91 and 91a positioned in response to the function of the cams B2 and B4, the cams B6 and B7 actuate the switches V6 and V7, respectively, to connect the lead line L1 to the left and right hand motors 135 and 135a which operate the lower vertical jacks 39 to raise the rail end sections 37 and 38 into contact with corresponding crown switches 91 and 91a (FIG. 6). Each of the switch circuits V6 and V7 is in series connection with a corresponding closed crown sensor switch 91 and 91a so that on contact of a rail crown section 46, with a crown contact switch 91 or 91a such contact opens the circuits of the switches V6 or V7 to stop further vertical elevation of an associated rail end section.

The cam B8 is a hydraulic pressure control cam that operates the relay R5 through its associated switch V8 to provide for a low hydraulic pressure being applied on the clamp structures 34 and 36 during the vertical adjustment upwardly of the rail end sections 37 and 38. On completion of such vertical adjustment of the rail end sections 37 and 38, the cams B3 and B5 function to reversibly operate the left and right hand motors 96 and 96a to provide for the movement of the web contact switches 88, 89, 88a and 89a and crown contact switches 91 and 91a out of engagement with the rail end sections.

As previously mentioned, prior to the automatic axial aligning of the rail end sections 37 and 38 in the welding machine 24, the rail aligning apparatus 26 is initially adjusted to provide for the positioning of the web sensors 88, 89, 88a and 89a in a reference or base plane into which the sensed side surfaces of the rail web sections 49 are to be moved. For this initial adjustment (FIG. 10) the push button switch 119 is actuated to close the circuit for the double acting air cylinder 76 to move the sensing apparatus 26 to its stop position defined by the stop member 78 wherein the apparatus is held by the closing of holding switch 75 to close the circuit of the air solenoid valve SV1 and connect lead line L1 into the rail aligning circuit. The switch 119 is then released and the vertical jacks 39 and 41 are manually controlled by closing of the manual switches 120 and 120a to energize relays R10 and R12, respectively, to reversibly operate the motors 135 and 135a to lower the reference rail 22 to the predetermined low position as defined by the normally closed limit switches 125 and 125a. (FIGS. 10 and 15). Prior to any forward rotation of the motors 96 and 96a to advance the web sensor switches toward the reference rail 22, a high hydraulic pressure is applied to the clamp structures 34 and 36 through the normally closed contacts 127 of the relay R5 to energize solenoid S2 shown in FIG. 14. In this respect, it is to be noted that the switch 128 functions as a reset button to condition the relay LR3 for automatic operation of the rail aligning apparatus 26. With the relay LR3 in the reset condition the contacts x and y of the relay switches W1, W2, W3 and W4 are closed. The left and right hand motors 96 and 96a are now manually controlled.

As shown for the left hand motor 96, the sensors 88 and 89, corresponding thereto, are advanced on manual actuation of the push button switch 121 to connect the lead line L1 to line L2 through the relay R1 which on being energized closes normally open contacts 122 to connect motor 96 to lines L1 and L2. If the motor 96 is to be backed up or reversed, the push button switch 123 is manually actuated to similarly energize the relay R2, through the normally closed reverse limit switch 124, to close the normally open contacts 126.

When a motor 96 or 96a is in its backed up position, a manual push button 129 is closed to energize the relay R5 to open the contacts 127 and close the contacts 130 whereby the solenoid S1 is energized (FIGS. 10 and 14). On a release of the push button 129 the solenoid S2 is automatically energized to provide for the application of a high hydraulic pressure on the clamp structures 34 and 36. It is to be understood that the adjustments of the clamp structures 34 and 36 to establish the reference or base plane for the sensor switches 88, 89, 88a and 89a are made relative to any adjustments that may be required of the adjustable stop member 78 on the welding machine frame 31; of the plate member 51 about the vertical axis 54; and of the sensor switches on the mounting panels 84 and 84a.

When all of the web contact or sensor switches are in lateral alignment and in contact engagement with the rail web surface lying in the reference plane, the vertical jacks 39 and 41 are adjusted by manual actuation of the switches 115 and 115a to elevate the reference rail to a horizontally level position, above the lower position thereof wherein the web sensor switches were simultaneously engaged with the web section 49. The crown switches 91 and 91a are then moved into contact engagement with the crown surface 46 of the reference rail. following this adjustment of the crown switches 91 and 91a, the rail aligning apparatus 26 is swung to its rest position, shown in dotted lines in FIG. 2, by manual actuation of the push button switch 131 to energize the solenoid SV2 in the control circuits for the air cylinder 76.

As shown in FIG. 10, a lead line LA is connected ahead of the holding switch 75. On a momentary depression of the reset switch 128, therefore, the contacts $x\,y$ of W3 and W4 of the latch up relay LR3 are closed to energize the relays R10 and R12, through the normally closed down limit switches 125 and 125a which close the normally open contacts 134 and 134a. The motors 135 and 135a are thus reversed to lower the rails to a position determined by the opening of the limit switches 125 and 125a. The rails 22 to be welded together are then moved to locate their end sections 37 and 38 in the welding zone 29. With the rails in their lowered positions the switch 119 is momentarily depressed to provide for the swinging of the frame 51 into the operating position therefor in which it is held by the holding switch 75. On closing of the switch 119 the coil 136 of the latch up relay LR3 is energized to close contacts $y\,z$ of the switches W1 and W2 to close the circuit for the high pressure solenoid S2 through the normally closed contacts 127. Closing of the switch 109 closes the circuits for the horizontal sequence motors 106 and 106a through the switches H1 to provide the cycle cams A1 for the left and right hand sequence motors 106 and 106a taking over.

With the horizontal sequence motors in operation, the cams A2 are rotated to close the microswitches H2 and energize the motors 96 and 96a to advance the sensor or web contact switches 88, 89, 88a and 89a toward the web sections 49 of the rail end sections 37 and 38. The time interval required for the advance of a motor 96 and 96a and which time interval is built in the cams A2, is about 10 percent more than is needed for the web sensors to make contact with the rail web sections 49. This greater time interval assures that such contact will be made before an advance cam A2 has completed its time travel. During the time interval of the advance of the motors 96 and 96a, the memory reset cams A4 operate for a short period to reset or cock the memory relays LR1 and LR2. The time requirement for this reset interval is only a milli-second or two.

Immediately following the advance interval of the motor 96 or 96a, a reverse cam A3 actuates its associated switch H3 to move the web sensors away from a rail so that a holding clamp structure 34 or 36 can be adjusted. Following the reverse interval of a motor 96 or 96a, a cam A5 operates its corresponding switch H5 to connect the relays R3 and R4 of a motor 111 or 111a (FIGS. 10 and 14). This connection is made through the M2 contacts of the relays LR1 and LR2 with whatever relay LR1 or LR2 has been operated and determine in which direction a rail end section 37 or 38 is to be moved by a motor 111 or 111a to bring such sections into lateral alignment. At the same time that the cam A5 is in operation, the cam A6 operates the relay R5 to open the circuit of the high pressure solenoid S2 and close the circuit of the low pressure solenoid S1 so that the motors 111 and 111a can make their adjustments. This sequence of operations takes place during one revolution of the sequence cam shaft 104.

The horizontal sequence motors 106 and 106a for the left and right hand rail end sections 37 and 38, respectively, will continue to make single revolutions until all of the web sensors 88, 89, 88a and 89a make simultaneous contact with the rail end sections to simultaneously operate the relays LR1 and LR2. This simultaneous contact of the web sensors indicates adjustment of the rail end sections into lateral alignment. As long as only one of the relays LR1 or LR2 is operated, the horizontal sequence motor, corresponding to the non-operated relay, will be compelled to make another revolution since the M3 contacts on the relays LR1 and LR2 will automatically start a horizontal sequence motor on another revolution. Thus, only when all of the web sensors 88, 89, 88a and 89a operate will the horizontal sequence motors 106 and 106a stop at their home positions, since only then will both of the M3 contacts be open.

It is to be noted that since the operations of the left hand and right hand sequence motors 106 and 106a are independent of one another, different time periods may be required to bring these motors into home position.

Since lateral alignment of the rail end sections 37 and 38 is accomplished prior to vertical alignment of the end sections to bring the sections into axial alignment, some provision must be made to hold the vertical alignment procedure until the rail end sections 37 and 38 are laterally aligned. This holding action is accomplished by the relays R6 and R7 whose contacts 112 and 113 are in series so as to form an and logic. The relay R6 winding is connected across the horizontal sequence motor 106 so that as long as this motor is in operation the relay R6 will be energized to hold its normally closed contacts 112 open. In a like manner, the relay R7 for the right hand sequence motor 96a is connected across such motor to hold the normally closed contacts 113 open. Thus, as each horizontal sequence motor stops, the respective contacts 112 and 113 of the relays R6 and R7 will close indicating that both of the sequence motors have completed their lateral alignment program for the rail end sections 37 and 38.

The lead line L1 is connected to the vertical sequence motor 116 through the series contacts 114 of the thermo delay relay R8. Aat the moment the series connected contact relays R6 and R7 close, the lead line L1 is also connected to the thermo element 137 of the delay relay R8. After about a 10 second delay, the contacts 114 of the relay R8 open to insure that the vertical sequence motor 116 will make only one revolution and then stop at its home position. As the vertical sequence motor 116 starts its revolution the actuating cams B2 and B4 operate to close their corresponding switches V2 and V4 whereby to simultaneously operate the motors 96 and 96a in a forward direction to move the web contact switches 88, 89, 88a and 89a into simultaneous engagement with the web sections 49 of the rail end sections 37 and 38. After this contact engagement takes place, the low hydraulic pressure cam B8 actuates the microswitch V8 to close the circuit of the relay R5 providing for the actuation of the low pressure solenoid S1. With the clamping structures 34 and 36 having low hydraulic pressure applied thereto, the cams B6 and B7 actuate their corresponding microswitches V6 and V7 to energize the motors 135 and 135a to raise the vertical jacks 41 of the clamping structures 34 and 36.

The microswitches V6 and V7 are connected to the relays R9 and R11, respectively, of the motors 135 and 135a through series closed contacts on the crown sensing switches 91 and 91a. On contact engagement of the crown surfaces of the rail end sections 37 and 38 with their corresponding crown sensor switches 91 and 91a, such switches are open to halt vertical upward movement of the lower jacks 41. As previously explained, this vertical alignment of the rail end sections 37 and 38, following the previous lateral alignment of such end sections, provides for an axial alignment of the rail end sections. Thus, on completion of the vertical alignment the cam B8 opens its associated microswitch V8 so that a full holding or high hydraulic pressure is again applied to the rail end sections for the succeeding welding operation. With a full holding pressure applied on the rails the cams B3 and B5 actuate their corresponding microswitches V3 and V5 to reverse the motors 96 and 96a, corresponding to the end sections 37 and 38, so as to move the web contact switches 88, 89, 88a and 89a and crown contact switches 91 and 91a away from the rails. This reversed operation of the motors 96 and 96a continues until the circuits therefor are open by the limit switches 124. The vertical sequence motor 116 then completes its cycling rotation of one revolution and stops.

A pilot lamp 138 is connected across the vertical sequence motor 116 so that on de-energization of the motor 116 the light will go out, indicating to the operator that axial alignment of the rail has been completed and that the sensing apparatus 26 may now be moved to its rest position. This movement is accomplished by a manual operation of the switch 131 to simultaneously close the circuit for the solenoid valve SV2 and open the circuit of the solenoid valve SV1. With the sensing apparatus 26 thus removed, the welding operation is performed in the usual manner and on its completion a pulse of lead line L1 is received by the latch up relay LR3 through contacts y z of W1 from the line indicated as W M, which is connected in the circuit of the welding unit for such purpose. Energization of the coils 136 and 139 of the latch up relay LR3 opens contacts y z of W2, to provide for the de-energization of the high hydraulic holding pressure solenoid valve S2. Concurrently with the opening of the contacts y z of W2, the contacts x y of W3 are closed to operate the motors 135 and 135a for lowering the vertical jacks 41 of the clamp structures 34 and 36. The welded rail assembly 28 is then moved toward the left, as viewed in FIG. 1, and a new rail 22 moved into position with its leading end 38 abutting the trailing end 37 of the continuous rail 28. With the new rail in position within the welding zone 29, the alignment procedure described above is automatically repeated.

The hydraulic control system for the clamp structure 34, corresponding to the left hand rail, is shown in FIG. 14 and is seen to include motors 111 and 135 for operating associated jacks 42 and 41, respectively, which as shown for the jack 41 in FIG. 15 is comprised of a screw 47 threadably received within an internally threaded sleeve 141 that is mounted on a gear reduction unit 142 which is provided on the motor 135. A socket 143 in the screw 140 is of a polygonal shape in transverse cross section to matingly receive in telescopic engagement a power take off shaft 144 from the reduction unit 142. It is seen, therefore, that in response to a forward and reverse rotation of the shaft 144 the screw 47 is movable toward and away from the rail 22. The horizontal jack 42 is constructed and operated in all respects similar to the lower vertical jack 41 with corresponding parts being indicated by like numbers in FIG. 14.

The upper vertical jack 39 and rear horizontal jack 43 (FIG. 15) are similar in construction and operation and are illustrated as comprised of a double acting cylinder assembly 146 having a piston rod 147 engageable with the rail 22.

As previously described, when the motors 96 and 96a of the rail aligning apparatus 26 are being reversed, the solenoid S1 is energized to operate a valve 140 for the application of an idle or low hydraulic pressure on the jacks 39 and 43. This pressure is such that a rail 22 is maintained in a previously adjusted position while being movable relative to the holding jacks. With the solenoid S1 energized, the valve 140 therefor, is movable to the left, as viewed in FIG. 14, across the inlet and outlet ports 149 and 151, in the valve housing 152. Oil under pressure from the pump P travels through a pressure regulating valve 153 having an exhaust line 154 connected to an oil reservoir 156. The pressure line 157 from the regulating valve 153 is connected to the port 149. From the port 149 the pressure side of the cylinder assemblies 146 is indicated in full lines and the exhaust side thereof in dash lines.

On the advance of the web contact switches 88, 89, 88a and 89a toward the rails 22 in response to forward rotations of the motors 96 and 96a, the solenoid S1 is de-energized and the solenoid S2 is energized to provide for a high holding hydraulic pressure being applied on the jacks 39, 41, 42 and 43. In response to energization of the solenoid S2, the valve 158 thereof is moved to the right, as viewed in FIG. 14, into an operating relation with the supply and exhaust ports 149 and 151. Under this condition the supply side of the cylinders is indicated in dash lines and the exhaust side of the circuit in full lines. Thus, in response to a forward or a reverse rotation of the motors 111 and 135, a screw jack 47 is advanced or reversed to provide for the desired adjustment of a rail 22 which is retained during the sensing and welding operations by a holding or high hydraulic pressure.

Although the invention has been described with respect to a preferred embodiment thereof, it is to be understood that it is not to be so limited since changes and modifications can be made therein which are within the full intended scope of this invention as defined by the appended claims.

I claim:
1. In combination with a machine for butt welding together the end surfaces of adjacent end sections of like elongated members in an end to end relation to form a continuous single elongated unit comprised of a plurality of said like members and wherein adjacent end sections are releasably locked in a welding zone by linearly adjustable pressure applying mechanisms during a welding operation and then released for movement out of the welding zone, of an:
   a. apparatus for automatically axially aligning adjacent end sections of said like members for butt welding together the end surfaces thereof including a frame structure,
   b. means movably mounting said frame structure on the machine for horizontal movement to an operating position adjacent said welding zone and to a rest position remote from said welding zone,
   c. a pair of carriage units corresponding to the adjacent end sections of said like members,
   d. means movably supporting each of said carriage units on said frame structure for horizontal movement transversely of and toward and away from a corresponding side surface of said end sections, when the frame structure is in the operating position therefor,
   e. a pair of surface sensing switches on each carriage unit spaced longitudinally of an end section and facing the corresponding side surface thereof when the frame structure is in said operating position, said sensing switches having surface engaging portions in a common vertical plane defining a laterally aligned co-planar position of said side surfaces,
   f. means for independently reciprocally moving said carriage units to move said sensing switches into and out of contact engagement with the side surfaces of corresponding end sections,
   g. means responsive to the contact engagement of a single sensing switch for controlling the pressure applying mechanisms to progressively laterally move the end sections a predetermined increment distance to said laterally aligned positions, and
   h. means responsive to the simultaneous contact engagement of all of the sensing switches with corresponding end sections for controlling said pressure applying mechanisms to vertically move said adjacent sections into axial alignment.

2. In a machine for butt welding together the adjacent end sections of like elongated members to form a continuous multi-member assembly wherein adjacent end sections of said elongated members are releasably locked in a welding zone by linearly adjustable pressure applying mechanisms for welding and then released for movement out of the welding zone:
   a. apparatus for automatically positioning said elongated members in axial alignment for welding together said adjacent end sections including an electrical sensing unit for controlling said pressure applying mechanisms to linearly align said adjacent end sections in response to a lateral misalignment thereof comprising a horizontal frame,
   b. means movably mounting said horizontal frame on the machine for horizontal movement transversely thereof to an operating position, wherein one end of said horizontal frame is opposite one of the sides of said adjacent end sections, and to a rest position remote from said one sides of the end sections,
   c. said sensing unit including a pair of like contact switch structures corresponding to each of said end sections,
   d. means mounting said switch structures on said horizontal frame for independent relative movement in parallel paths, each of said switch structures including a pair of normally open sensing switches,
   e. means on said horizontal frame for reciprocally moving said contact switch structures for contact engagement of one or the other of the sensing switches thereof into and out of contact engagement with a corresponding end section,
   f. means operable in response to the contact engagement of a single sensing switch for controlling said pressure applying means to progressively laterally move a corresponding end section toward said laterally aligned position,
   g. means responsive to a simultaneous engagement of all of said sensing switches with the end sections corresponding thereto for controlling said pressure applying mechanisms to vertically move said end sections into axial alignment,
   h. means for rendering said sensing unit inoperative when all of said sensing switches are in simultaneous engagement with the one sides of said adjacent sections to define the laterally aligned positions thereof, and
   i. means for moving said sensing unit to the rest position thereof when said end sections are in said axially aligned position.

3. The method for forming a single continuous elongated unit from a plurality of like elongated members having adjacent end sections axially aligned and butt welded together comprising:
   a. supporting adjacent end sections of said elongated members in an end to end relation with opposing end faces thereof in abutting engagement,
   b. electrically sensing said adjacent end sections for lateral misalignment of one of the corresponding side surfaces thereof,
   c. relatively moving said end sections a predetermined increment distance toward laterally aligned positions therefor in response to each sensing operation,
   d. terminating the sensing operation when the corresponding side surfaces of the end sections are in lateral alignment,
   e. vertically adjusting the end sections into axial aligned positions therefor, and then
   f. butt welding said end sections together.

4. The method for forming a single continuous elongated unit from a plurality of like elongated members having adjacent end sections axially aligned and butt welded together comprising:
   a. supporting said end sections for relative horizontal lateral and vertical movements with the end faces of said adjacent end sections in abutting engagement,
   b. electrically sensing each end section at longitudinally spaced portions of corresponding side surfaces thereof for lateral misalignment relative to a common vertical reference plane,
   c. correcting the sensed lateral misalignment after each sensing operation by transversely horizontally moving said end sections relative to each other predetermined incremental distances to progressively move the corresponding one side surfaces thereof into said reference plane, d. relatively vertically adjusting said end sections to axially aligned positions therefor, and then e. butt welding together said end faces.

* * * * *